United States Patent [19]

Takenouchi et al.

[11] Patent Number: 5,273,852
[45] Date of Patent: Dec. 28, 1993

[54] ELECTROPHOTOGRAPHIC PHOTORECEPTOR EMPLOYING POLYSILANE-TYPE CARRIER TRANSFER POLYMERIC MATERIAL

[75] Inventors: Shigeki Takenouchi; Kiyoshi Tamaki; Hideyuki Matsumoto, all of Hachioji, Japan

[73] Assignee: Konica Corporation, Tokyo, Japan

[21] Appl. No.: 848,099

[22] Filed: Mar. 9, 1992

[30] Foreign Application Priority Data

Sep. 17, 1991 [JP] Japan .................................. 3-231897

[51] Int. Cl.$^5$ .............................................. G03G 5/04
[52] U.S. Cl. ........................................ 430/96; 430/58
[58] Field of Search .............................. 430/96, 58, 59

[56] References Cited

U.S. PATENT DOCUMENTS 4,828,952  5/1989  Kato et al. ............................ 430/96
5,053,301  10/1991  Kato et al. ............................ 430/96

Primary Examiner—John Goodrow
Attorney, Agent, or Firm—Frishauf, Holtz, Goodman & Woodward

[57] ABSTRACT

An electrophotographic photoreceptor is disclosed. The photoreceptor comprises a conductive support and provided thereon, a layer comprising a carrier generating material and a polymer having a repetition unit represented by the following formula (1);

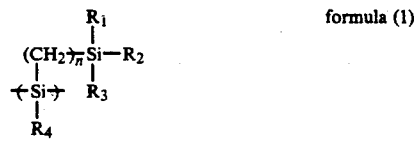

wherein $R_1$, $R_2$, $R_3$, and $R_4$ independently represent a hydrogen atom, an alkyl group, an alkoxy group, an alkenyl group, an aryl group, an alkylsilyl group or an arylsilyl group, and n is a natural number.

8 Claims, 4 Drawing Sheets

ELECTROPHOTOGRAPHIC PHOTORECEPTOR EMPLOYING POLYSILANE-TYPE CARRIER TRANSFER POLYMERIC MATERIAL

FIELD OF THE INVENTION

The present invention relates to a polysilane-type hole-transferring polymeric material and application thereof to electrophotography.

BACKGROUND OF THE INVENTION

As the electrophotographic photoreceptor, there has been widely used an inorganic photoreceptor having an inorganic photoreceptive layer comprised of an inorganic photoconductive compound, such as selenium, zinc oxide or cadmium sulfide.

However, these compounds are not necessarily satisfactory in sensitivity, heat stability, moisture resistance and durability. For example, an inorganic photoreceptor having an inorganic photoreceptive layer comprised of selenium is liable to crystallize and deteriorate in photoreceptive properties at a high temperature; therefore, it requires not only a strict temperature control in manufacturing but also a preventive measure against crystallization caused by heat or fingerprints in handling. Further, an inorganic photoreceptor having an inorganic photoreceptive layer comprised of cadmium sulfide or zinc oxide is not satisfactory in moisture resistance and durability.

Under the circumstances, there are actively studied and developed in recent years organic photoreceptors having an organic photoreceptive layer comprised of an organic photoconductive compound.

Japanese Pat. Exam. Pub. No. 10496/1975, for example, discloses an organic photoreceptor having an organic photoreceptive layer containing poly-N-vinylcarbazole and 2,4,7-trinitro-9-fluorenone, but this organic photoreceptor is not necessarily satisfactory in sensitivity and durability.

To eliminate such defects, there has been developed an organic photoreceptor having a function-separating organic photoreceptive layer in which a carrier (hole or electron) generation function and a carrier transfer function are separately provided by different materials. Such a function-separating organic photoreceptor has an advantage that the materials for the photoreceptive layer can be selected from a wide range of compounds to prepare a photoreceptor having desired properties with ease.

As materials having the carrier generation function, various azo compounds are practically used, and as materials responsible for the carrier transfer function, many compounds are proposed, for example, in Japanese Pat. O.P.I. Pub. Nos. 94829/1976, 72231/1977, 27033/1978, 52063/1980, 65440/1983 and 198425/1983.

However, an organic photoreceptor comprised of such a carrier transfer material is not necessarily satisfactory in carrier transfer property, and when used in a rapid copying process at a low environmental temperature, it causes disadvantages such as deterioration in sensitivity and rise in residual potential. Further, when the simplification of copying process is attempted by decreasing the size of photoreceptor drums, conventional carrier transfer materials have no adequate carrier transferring capability, and thereby decreasing the size of photoreceptor drums inevitably leads to drop in process speed.

In order to solve such problems, there are recently proposed, in Japanese Pat. O.P.I. Pub. Nos. 10747/1986, 269964/1987 and 285552/1988, a technique to use a polysilane having a specific structure as a carrier (hole) transfer material. Unlike conventional carrier transfer materials, such a polysilane has a film-forming property by itself and can readily form a photoreceptive layer in the form of film without being combined with other binders. Moreover, it has a hole mobility of approximately $10^{-4}$ cm$^2$/V·sec or more, which is ten or more times as large as that of conventional carrier transfer materials. Accordingly, the disadvantage inherent in the organic photoreceptor comprised of a conventional carrier transfer material can be removed by use of this material.

However, a photoreceptive layer comprised of this polysilane has other disadvantages such as insufficient flexibility, comparatively low film strength and weak adhesive property. Therefore, even when the polysilane is formed into a film on a flexible belt support, damages such as cracks and peeling are liable to occur, and such damages advance further in course of repetition of the electrophotographic process. In addition, the rubbing force exerted by a toner in the developing process or by a cleaning member in the cleaning process causes surface damages or peeling of the photoreceptive layer, and these damages produce defects such as white lines and black lines at an early stage of the copying process and thereby deteriorate the quality of copied images. This phenomenon is frequently observed when the size of the drum is decreased or the curvature of belt substrates is increased for the simplification of the copying process.

SUMMARY OF THE INVENTION

Accordingly, the object of the present invention is to provide (1) a carrier transfer material excellent in hole transferring capability, (2) a photoreceptive layer excellent in hole transferring capability, flexibility, mechanical strength and adhesive property, and (3) an electrophotographic photoreceptor in which down sizing and speed-up of the copying process are compatible.

The above objects of the invention are attained by an electrophotographic photoreceptor containing a polymer having a repetition unit represented by the following formula (1) or a polysilane-type hole-transferring polymeric material having the repetition unit.

Formula (1)

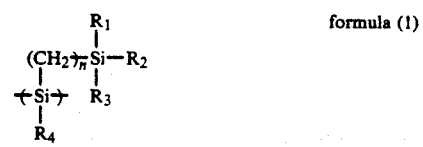

formula (1)

In the formula, $R_1$, $R_2$, $R_3$ and $R_4$ independently represent a hydrogen atom, or a substituted or unsubstituted alkyl, alkoxy, alkenyl, aryl, alkylsilyl or arylsilyl group; n is a natural number, which is not limited particularly, but preferably 1 to 5.

DETAILED DESCRIPTION OF THE INVENTION

The present invention is hereunder described in detail.

The alkyl group represented by $R_1$ to $R_4$ of Formula (1) includes linear or branched alkyl groups having 1 to 24 carbon atoms, preferably 1 to 8 carbon atoms, such as a methyl, ethyl, propyl, butyl, amyl, hexyl, octyl, nonyl, decyl, pentadecyl and stearyl group, cycloalkyl groups such as a cyclohexyl group, and substituted ones of these alkyl groups.

The aryl group is preferably one having 6 to 24 carbon atoms, such as a phenyl, naphthyl or anthryl group.

The alkoxy group is preferably one having 1 to about 10 carbon atoms, such as a methoxy, ethoxy, propoxy or butoxy group.

The alkenyl group is preferably one having 2 to about 10 carbon atoms, such as a vinyl, allyl or butenyl group.

The alkylsilyl group includes $-SiH(CH_3)_2$, $-Si(CH_3)_3$, $-Si(CH_3H_7)_3$, $-Si(C_4H_9)_3$, $-Si(CH_3)_2(C_2H_5)$ and $-Si(CH_3)(C_2H_5)_2$.

The arylsilyl group includes $-SiH(C_6H_5)_2$, $-Si(CH_3)_2(C_6H_5)$ and $-CH_2Si(CH_3)_2(C_6H_5)$.

The substituent of the above $R_1$ to $R_4$ or aryl group includes an alkyl, alkoxy aryl, amino, nitro and cyano group, a halogen atom and other substituents.

Preferable silane monomers copolymerised with the monomer unit represented by Formula (1) are those illustrated below. In these illustrations, the structure of a divalent monosilane residue having a hydrogen or substituent is shown by $-(R^1)Si(R^2)-$, $-(R^1)_2Si(R^2)-$ or the like.

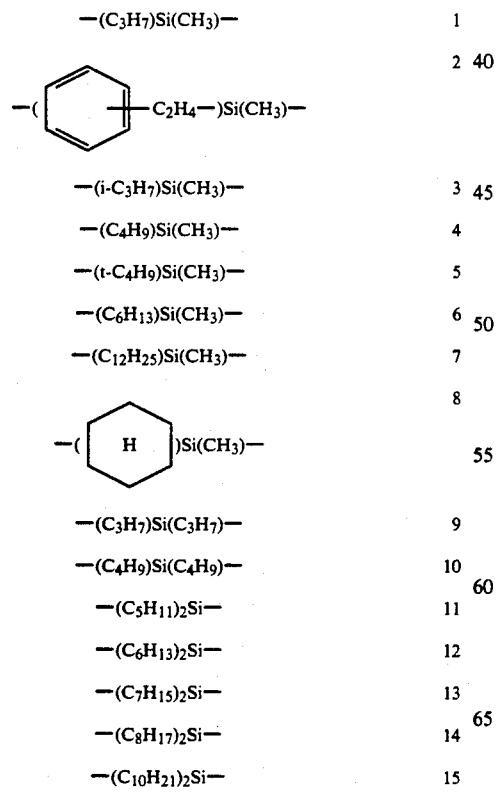

Next, typical examples of the polysilane polymeric material having the repetitive unit represented by Formula (1) are illustrated below, but the scope of the invention is not limited to them.

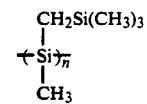  P-1

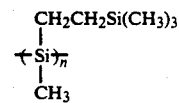  P-2

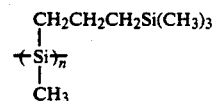  P-3

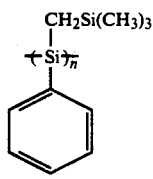  P-4

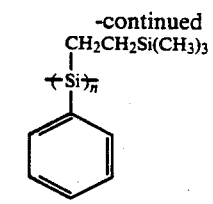 P-5

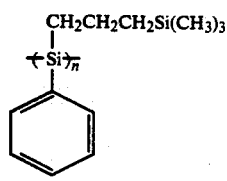 P-6

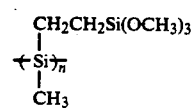 P-7

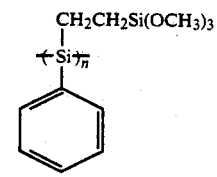 P-8

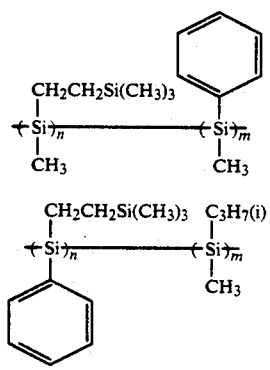 P-9

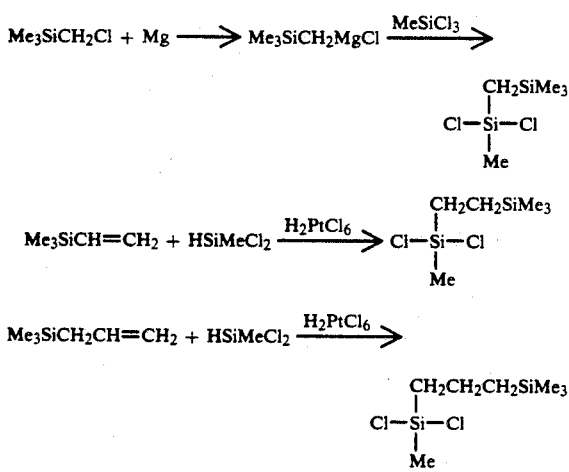 P-10

Synthesis examples of the polysilane polymeric material of the invention are described below.

A. Synthesis of the monomer

The monomers used in the invention can be prepared according to the following reaction equations:

$$Me_3SiCH_2Cl + Mg \longrightarrow Me_3SiCH_2MgCl \xrightarrow{MeSiCl_3}$$

$$\begin{array}{c} CH_2SiMe_3 \\ | \\ Cl-Si-Cl \\ | \\ Me \end{array}$$

$$Me_3SiCH=CH_2 + HSiMeCl_2 \xrightarrow{H_2PtCl_6} \begin{array}{c} CH_2CH_2SiMe_3 \\ | \\ Cl-Si-Cl \\ | \\ Me \end{array}$$

$$Me_3SiCH_2CH=CH_2 + HSiMeCl_2 \xrightarrow{H_2PtCl_6}$$

$$\begin{array}{c} CH_2CH_2CH_2SiMe_3 \\ | \\ Cl-Si-Cl \\ | \\ Me \end{array}$$

(1) (Trimethylsilylmethyl)methyldichlorosilane

In a 300-ml flask equipped with a dropping funnel, reflux condenser, stirrer and nitrogen gas introducing tube were placed 5.8 g (0.24 mmol) of magnesium and 100 ml of diethyl ether. While stirring the mixture, a solution of 24.4 g (0.20 mol) of chloromethyltrimetylsilane in 50 ml of diethyl ether was dropwise added thereto over a period of 2 hours. After completion of the addition, the mixture was stirred for 12 hours to obtain chlorotrimethylsilylmethyl magnesium.

In a 1-1 flask equipped with a dropping funnel, reflux condenser, stirrer and nitrogen gas introducing tube were placed 149 g (1 mol) of methyltrichlorosilane and 250 ml of diethyl ether. While stirring the mixture, the above chlorotrimethylsilylmethyl magnesium was dropwise added thereto over a period of 2 hours. After completion of the addition, the mixture was refluxed with heating and stirring for 36 hours. After cooling, 200 ml of hexane was added to the reaction mixture, and the salts formed were filtered off. The filtrate was condensed and vaccum-distilled. 11.7 g (yield: 43%) of (trimethylsilylmethyl)methyldichlorosilane was obtained.

[Reference material]

D. Seyferth and E. G. Rochow, J. Org. Chem., 20, 250 (1955).

(2) (2-Trimethylsilylethyl)methyldichlorosilane

There was allowed 100 g (1.0 mmol) of trimethylsilyl ethene to react with 127 g (1.1 mol) of methyldichlorosilane in a 500-ml flask equipped with a dropping funnel, reflux condenser, stirrer and nitrogen gas introducing tube, by steps of placing 20 ml of a mixture of trimethylsilyl ethene and methyldichlorosilane and 0.0051 g (0.01 mmol) of chloroplatinic acid in the flask, adding dropwise the remaining mixture of trimethylsilyl ethene and methyldichlorosilane thereto over a period of 4 hours while stirring the reaction mixture, and continuing the stirring for another 1 hour to complete the reaction. Subsequently, 200 ml of hexane was added to the reaction mixture, and the catalyst precipitated was filtered off. The filtrate was condensed and vaccum-distilled. 145 g (yield: 75%) of (2-trimethylsilylethyl)methyldichlorosilane was obtained.

[Reference material]

J. W. Ryan, G. K. Menzie, and J. L. Speier, J. Am. Chem. Soc., 82, 3601 (1960).

B. Synthesis of the polymer (1) Synthesis of poly(trimethylsilylmethyl)methylsilylene Example 1

In a 500-ml flask equipped with a dropping funnel, reflux condenser, stirrer and nitrogen gas introducing tube were placed 20 g (100 mmol) of (trimethylsilylethyl)methyldichlorosilane and 200 ml of toluene. While stirring the mixture at 110° C., a slurry containing 5.3 g (270 mmol) of sodium in 100 ml of toluene was added dropwise over a period of 30 minutes. After completing the addition, the reaction mixture was refluxed for 72 hours with heating and stirring. After cooling the reaction mixture, 50 ml of hexane and 50 ml of methanol were added thereto to decompose the unreacted sodium. Then, 100 ml of a dilute hydrochloric acid was added, the solvent layer was separated, and the aqueous layer was extracted with hexane. After combining the separated liquor and the extracted liquor, the liquor was washed with water and dried over anhydrous magnesium sulfate, then the solvent was removed by use of a rotary evaporator. Washing of the residue with acetone followed by vacuum drying gave 0.50 g (yield: 4%) of the polymer having Mw of $9.8 \times 10^5$ and Mw/Mn of 1.6.

Example 2

Sodium and toluene were placed in a 300-ml flask equipped with a dropping funnel, reflux condenser, stirrer and nitrogen gas introducing tube, then the contents were heated and stirred vigorously to make the sodium small particles. While continuing the stirring at 110° C., a solution of 7.5 g (37 mmol) of (trimethylsilylmethyl)methyldichlorosilane in 80 ml of toluene was added dropwise over a period of 1 hour. After the addition, the reaction mixture was refluxed for 66 hours with heating and stirring. Then, the reaction mixture was cooled, and 50 ml each of hexane and methanol were added thereto to decompose the unreacted sodium. After adding 100 ml of a dilute hydrochloric acid, the solvent layer was separated, and the aqueous layer was extracted with hexane. The separated liquor and the extracted liquor were combined, then it was washed with water and dried over anhydrous magnesium sulfate, followed by removal of the solvent by use of a rotary evaporator. The residue was washed with acetone and dried in vacuo so that 0.30 g (yield: 6%) of the objective polymer was obtained, whose Mw was $9.8 \times 10^5$ and Mw/Mn was 1.6.

Example 3

In a 200-ml flask equipped with a dropping funnel, reflux condenser, stirrer and nitrogen gas introducing tube were placed 10 g (50 mmol) of (trimethylsilylmethyl)methyldichlorosilane, 0.66 g (2.5 mmol) of 18-crown-6 and 50 ml of diethyl ether. While stirring the mixture at 35° C., a slurry containing 2.7 g (117 mmol) of sodium in 100 ml of diethyl ether was added dropwise over a period of 30 minutes. Then, the mixture was refluxed for 46 hours with heating and stirring. After cooling the reaction mixture, 50 ml of hexane and 50 ml of methanol were added thereto to decompose the unreacted sodium. Subsequently, 100 ml of a dilute hydrochloric acid was added, then the solvent layer was separated, and the aqueous layer was extracted with acetone. The separated liquor and the extracted liquor were combined, then washed with water and dried over anhydrous magnesium sulfate, followed by solvent removal by means of a rotary evaporator. Washing of the residue with acetone followed by drying in vacuo gave 3.7 g (yield: 57%) of the polymer, of which Mw was $9.2 \times 10^4$ and Mw/Mn was 2.3.

An IR spectral map of the above-obtained poly[(-trimethylsilylmethyl)methylsilylene] is shown in FIG. 1.

(2) Synthesis of poly[(2-trimethylsilylethyl)methylsilylene]

Example 4

In a 200-ml flask equipped with a dropping funnel, reflux condenser, stirrer and nitrogen gas introducing tube were placed 10 g (50 mmol) of (2-trimethylsilylethyl)methyldichlorosilane, 0.20 g (1 mmol) of 15-crown-5 and 100 ml of toluene. While stirring the mixture at 110° C., a slurry containing 2.3 g (100 mmol) of sodium in 40 ml of toluene was added dropwise over a period of 30 minutes. After completion of the addition, the mixture was refluxed for 46 hours with heating and stirring. The reaction mixture was then cooled, and 50 ml of hexane and 50 ml of methanol were added thereto to decompose the unreacted sodium. After adding 100 ml of a diluted hydrochloric acid, the solvent layer was separated, and the aqueous layer was extracted with hexane. The separated liquid and the extracted liquor were combined, then washed with water and dried over anhydrous magnesium sulfate, followed by solvent removal by use of a rotary evaporator. Washing of the residue with acetone followed by drying in vacuo gave 2.0 g (yield: 30%) of the polymer, of which Mw was $1.6 \times 10^5$ and Mw/Mn was 2.5.

An IR spectral map of the above-obtained poly[(2-trimethylsilylethyl)methylsilylene] is shown in FIG. 2.

(3) Synthesis of poly[(3-trimethylsilylpropyl)methylsilylene]

Example 5

In a 300-ml flask equipped with a dropping funnel, reflux condenser, stirrer and nitrogen gas introducing tube were placed 10 g (43 mmol) of (3-trimethylsilylpropyl)methyldichlorosilane, 0.48 g (2.2 mmol) of 15-crown-5 and 80 ml of diethyl ether. While stirring the mixture at 35° C., a slurry containing 2.4 g (104 mmol) of sodium in 120 ml of diethyl ether was added dropwise over a period of 30 minutes. After completion of the addition, the mixture was refluxed for 46 hours with heating and stirring. The reaction mixture was then cooled, and 50 ml of hexane and 50 ml of methanol were added thereto to decompose the unreacted sodium. After adding 100 ml of a diluted hydrochloric acid, the solvent layer was separated, and the aqueous layer was extracted with hexane. The separated liquid and the extracted liquor were combined, then washed with water and dried over anhydrous magnesium sulfate, followed by solvent removal by use of a rotary evaporator. Washing of the residue with acetone followed by drying in vacuo gave 1.0 g (yield: 15%) of the polymer, of which Mw was $3.6 \times 10^4$ and Mw/Mn was 1.7.

An IR spectral map of the above-obtained poly[(3-trimethylsilylpropyl)methylsilylene] is shown in FIG. 3.

The electrophotographic photoreceptor of the invention has an organic photoreceptive layer (hereinafter abbreviated to PCL) containing the foregoing specific hole transfer material (hereinafter referred to as h-CTM) silane polymer. That is, the electrophotographic photoreceptor of the invention fundamentally has a function-separating organic photoreceptive layer formed by combination of the silane polymer and a carrier generation material (hereinafter abbreviated to CGM) and is formed by laminating this organic photoreceptive layer directly or via another layer on a support, for example, on a conductive support. The structure of the organic photoreceptive layer is not particularly limited and may have various types as shown below.

(1) The structure in which a carrier transfer layer (hereinafter abbreviated to CTL) and a carrier generation layer (hereinafter abbreviated to CGL) are separately provided [hereinafter referred to as structure (1)].

2) The structure in which the CGL is not formed independently, and a CGM is dispersed in the silane polymer [hereinafter referred to as structure (2)].

In such a function-separating organic photoreceptive layer, an appropriate CGM can be selected from a wide range of compounds, because carrier generation and carrier transfer functions are separately allotted to different materials. Accordingly, there can be obtained an organic photoreceptor having properties required in the image forming process, such as high surface potential when electrified, high photosensitivity, and high stability in a duty-cycle operation.

Further, the specific h-CTM silane polymer according to the invention has a high film-forming property by itself; therefore, a CTL of structure (1) or a PCL of structure (2) can be formed without a binder.

A CTL of structure (1) or a PCL of structure (2) may be formed of the silane polymer alone, or if necessary, it may be formed jointly using other materials to give desired properties.

In the preferable embodiment of the invention, an auxiliary carrier transfer material (hereinafter referred to as o-CTM) is jointly used in order to accelerate the pour of carriers from a CGL to a CTL.

The preferred embodiments of the photoreceptor of the invention are exemplified in FIGS. 4(a)-4(d).

FIG. 4 (a) corresponds to structure (1), in which 1 is a conductive support, 2 is a carrier generation material, and 3 is a CGL containing the hole transfer material silane polymer of the invention, h-CTM, and an o-CTM. In said CTL, the o-CTM/h-CTM weight ratio is preferably 0.01 to 2.0. PCL 4 is composed of the above 2 and 3. FIG. 4 (b) corresponds to structure (2), in which a CGM, h-CTM and o-CTM are mixed together in PCL 4, and the o-CTM/CGM weight ratio is preferably 0.1 to 10.

FIGS. 4 (c) and (d) are modififications of structures (1) and (2), respectively. 2' of FIG. 4 (c) is a CGL containing an o-CTM and binder besides a CGM, the o-CTM/CGM weight ratio in 2' is preferably 0.1 to 10.

In FIG. 4 (d), an intermediate CTL 3' containing an o-CTM and binder is provided. In this intermediate CTL 3', the o-CTM/binder weight ratio is preferably 0.2 to 50, and the layer thickness is preferably 0.5 to 5 μm.

The o-CTM jointly used in the invention includes, for example, the compounds represented by the following formulas (2) to (7).

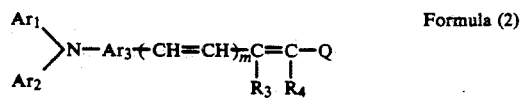

Formula (2)

In the formula, $R_3$ represents a hydrogen atom, or one of the following substituted or unsubstituted two groups: an alkyl and aryl group; $R_4$ represents a hydrogen atom, or one of the following substituted or unsubstituted two groups: a phenyl and naphthyl group; Q represents a substituted or unsubstituted phenyl group, or a condensed ring formed between a benzene ring and another different ring; $Ar_1$ and $Ar_2$ each represent a substituted or unsubstituted alkyl or naphthyl group; $Ar_3$ represents one of the following substituted or unsubstituted two groups: a phenylene and naphthyl group; and m represents 0 or 1.

The following are typical examples of the compound represented by Formula (2) which are favorably used in the invention.

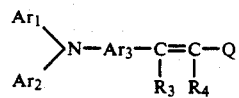

| Compound No. | $-Ar_1$ | $-Ar_2$ | $-R_3$ | $-R_4$ | $-Ar_3$ | $-Q$ |
|---|---|---|---|---|---|---|
| 2-1 | ⌬ | ⌬ | —H | | ⌬ ⌬ | ⌬ |
| 2-2 | ⌬-CH₃ | ⌬ | —H | | ⌬ ⌬ | ⌬-CH₃ |
| 2-3 | ⌬-OCH₃ | ⌬ | —H | | ⌬ ⌬ | ⌬-OCH₃ |
| 2-4 | ⌬ | ⌬ | —H | —H | ⌬ | ⌬(OCH₃)(OCH₃) |

-continued $$\begin{matrix} Ar_1 \\ \phantom{Ar_1}\diagdown \\ \phantom{Ar_1}N-Ar_3-C=C-Q \\ \phantom{Ar_1}\diagup \phantom{N-Ar_3-}| \phantom{=}| \\ Ar_2 \phantom{\diagup N-Ar_3-}R_3 R_4 \end{matrix}$$

| Compound No. | —Ar$_1$ | —Ar$_2$ | —R$_3$ | —R$_4$ | —Ar$_3$ | —Q |
|---|---|---|---|---|---|---|
| 2-5 | C$_6$H$_5$— | C$_6$H$_5$— | —H | —H | —C$_6$H$_4$— | —C$_6$H$_4$—CH$_3$ |
| 2-6 | C$_6$H$_5$— | C$_6$H$_5$— | —H | —H | —C$_6$H$_4$— | —C$_6$H$_4$—OCH$_3$ |
| 2-7 | C$_6$H$_5$— | C$_6$H$_5$— | —H | —H | —C$_6$H$_4$— | —C$_6$H$_4$—N(C$_2$H$_5$)$_2$ |
| 2-8 | 4-CH$_3$O—C$_6$H$_4$— | C$_6$H$_5$— | —H | —H | —C$_6$H$_4$— | —C$_6$H$_4$—CH$_3$ |
| 2-9 | 4-CH$_3$O—C$_6$H$_4$— | C$_6$H$_5$— | —H | —H | —C$_6$H$_4$— | —C$_6$H$_4$—OCH$_3$ |
| 2-10 | 4-CH$_3$O—C$_6$H$_4$— | C$_6$H$_5$— | —H | —H | —C$_6$H$_4$— | —C$_6$H$_4$—Cl |
| 2-11 | 4-CH$_3$—C$_6$H$_4$— | C$_6$H$_5$— | —H | —H | —C$_6$H$_4$— | —C$_6$H$_4$—Cl |
| 2-12 | 4-CH$_3$O—C$_6$H$_4$— | C$_6$H$_5$— | —H | —H | —C$_6$H$_4$— | 2,4-(CH$_3$)$_2$—C$_6$H$_3$— |
| 2-13 | 4-CH$_3$—C$_6$H$_4$— | C$_6$H$_5$— | —H | —H | —C$_6$H$_4$— | 2,4-(CH$_3$)$_2$—C$_6$H$_3$— |
| 2-14 | 4-CH$_3$—C$_6$H$_4$— | 4-CH$_3$—C$_6$H$_4$— | —H | —CH$_3$ | —C$_6$H$_4$— | —C$_6$H$_5$ |
| 2-15 | 4-CH$_3$O—C$_6$H$_4$— | 4-CH$_3$O—C$_6$H$_4$— | —H | —CH$_3$ | —C$_6$H$_4$— | —C$_6$H$_5$ |

-continued

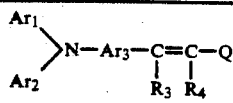

| Compound No. | $-Ar_1$ | $-Ar_2$ | $-R_3$ | $-R_4$ | $-Ar_3$ | $-Q$ |
|---|---|---|---|---|---|---|
| 2-16 | 4-methylphenyl | phenyl | $-H$ | phenyl | phenyl | 4-methylphenyl |
| 2-17 | 4-methoxyphenyl | phenyl | $-H$ | phenyl | phenyl | 4-methylphenyl |
| 2-18 | \multicolumn{6}{c}{diphenyl-C=CH—CH=CH—(4-N(CH$_3$)$_2$-phenyl)} |
| 2-19 | \multicolumn{6}{c}{diphenyl-C=CH—CH=CH—(3-OCH$_3$, 4-N(C$_2$H$_5$)$_3$-phenyl)} |
| 2-20 | \multicolumn{6}{c}{diphenyl-C=CH—CH=CH—(4-N(phenyl)$_2$-phenyl)} |

The compound represented by Formula (2) can be easily synthesized according to a method described, for example, in Japanese Pat. O.P.I. Pub. No. 198425/1983.

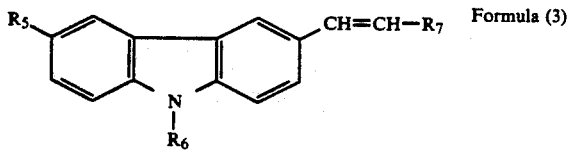

Formula (3)

In the formula, $R_5$ represents a hydrogen or halogen atom, or one of the following substituted or unsubstituted three groups: an alkyl, alkoxy and amino group, or a hydroxyl group; $R_6$ represents a substituted or unsubstituted aryl group; and $R_7$ represents one of the following substituted or unsubstituted two groups: an aryl and heterocyclic group.

The aryl group represented by $R_5$ includes, for example, a phenyl and naphthyl group. The halogen atom represented by $R_6$ includes, for example, a chlorine atom; the alkyl group includes, for example, a methyl and propyl group; and the alkoxy group includes, for example, a methoxy and ethoxy group.

The aryl group represented by $R_7$ includes, for example, a phenyl and naphthyl group; the heterocyclic group includes thienyl group.

When each of the groups by $R_5$ to $R_7$ has a substituent or substituents, such substituents are not particularly limited, but preferably a alkyl, aryl, alkoxy or substituted amino group, or halogen atoms, and such plural substituents may form a ring by bonding with each other.

The compound represented by Formula (3) is described in Japanese Pat. O.P.I. Pub. No. 44944/1989. The following are typical examples of the compound expressed by Formula (3) which are favorably used in the invention.

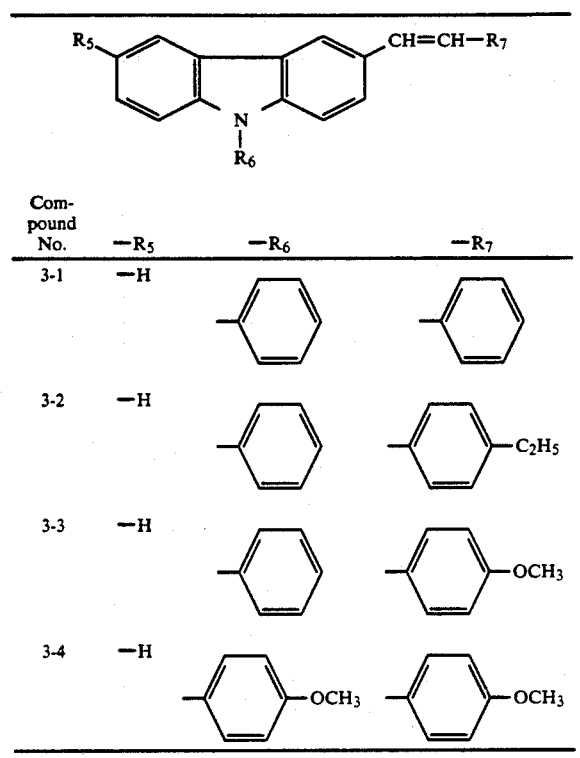

The compound represented by Formula (3) can be easily synthesized according to a method described, for example, in Japanese Pat. O.P.I. Pub. No. 172045/1985.

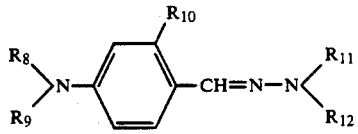
Formula (4)

In the formula, $R_8$, $R_9$, $R_{11}$ and $R_{12}$ each represent one of the following substituted or unsubstituted three groups: an alkyl, aralkyl and aryl group; and $R_{10}$ represents an alkyl or alkoxy group.

The alkyl group represented by $R_8$, $R_9$, $R_{11}$ or $R_{12}$ includes, for example, a methyl, ethyl, propyl, butyl and hexyl group; the aralkyl group includes, for example, a benzyl group; and the aryl group includes, for example, a phenyl and naphthyl group. The alkyl group represented by $R_{10}$ includes, for example, a methyl and propyl group. The alkoxy group includes, for example, a methoxy and ethoxy group. When the groups respectively represented by $R_8$, $R_9$, $R_{11}$ and $R_{12}$ have a substituent, the substituent is not particularly limited, but preferably an alkyl, aryl, alkoxy or substituted amino group, or a halogen atom.

In Formula (4), it is preferable that at least one of $R_{11}$ and $R_{12}$ be a substituted or unsubstituted naphthyl group.

The compound represented by Formula (4) is described, for example, in Japanese Pat. O.P.I. Pub. No. 44946/1989. The following are typical examples of the compound expressed by Formula (4) which are favorably used in the invention.

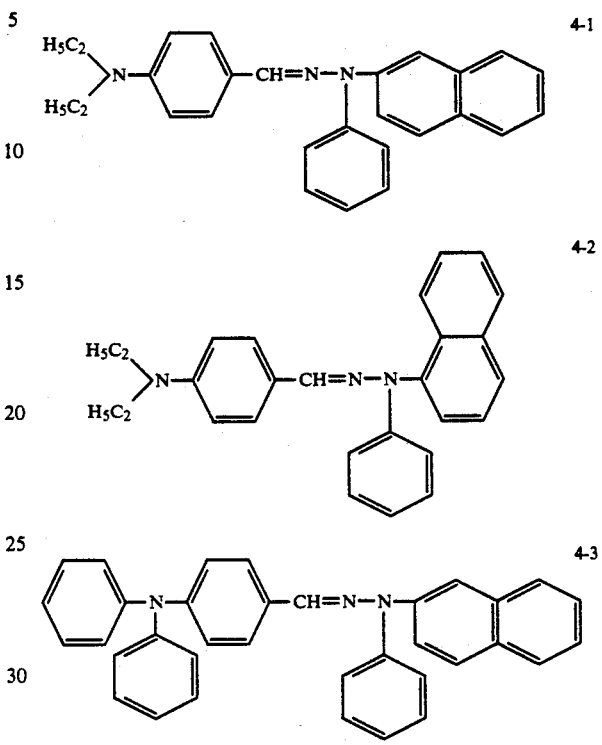

The compound represented by Formula (4) can be easily synthesized according to a method described, for example, in Japanese Pat. O.P.I. Pub. No. 101844/1982.

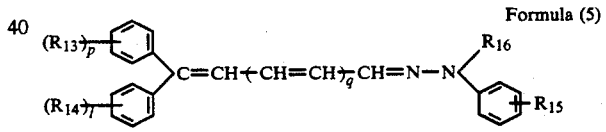
Formula (5)

In the formula, $R_{13}$, $R_{14}$ and $R_{15}$ each represent a hydrogen atom, or one of the following substituted or unsubstituted three groups: an alkyl, alkoxy and aryloxy group; $R_{16}$ represents a hydrogen atom, or one of the following substituted or unsubstituted three groups: an alkyl, alkenyl and aryl group; p and l each represent 1 or 2; q represents 0 or 1; and $R_{13}$ and $R_{14}$ may be the same or different, provided that p and l each are 2.

The alkyl group represented by $R_{13}$, $R_{14}$ or $R_{15}$ is preferably a lower alkyl group such as a methyl, ethyl, propyl, butyl or hexyl group; the alkoxy group is preferably a lower alkoxy group such as a methoxy, ethoxy, propoxy or butoxy group; and the aryloxy group is preferably, for example, a phenoxy group.

The alkyl group represented by $R_{16}$ is preferably a lower alkyl group such as a methyl, ethyl, propyl, butyl or hexyl group; the alkenyl group is preferably, for example, a 2-propenyl group; and the aryl group is preferably, for example, a phenyl group.

When the groups respectively represented by $R_{13}$ to $R_{14}$ have a substituent, examples of such substituent include an alkyl, aryl or alkoxy group and halogen atoms.

In Formula (5), $R_{13}$ and $R_{14}$ are preferably an alkyl or alkoxy group, $R_{15}$ is preferably a hydrogen atom, and $R_{16}$ is preferably an aryl group.

The compound represented by Formula (5) is described, for example, in Japanese Pat. O.P.I. Pub. No. 44949/1989. The following are typical examples of the compound represented by Formula (5) which are favorably used in the invention.

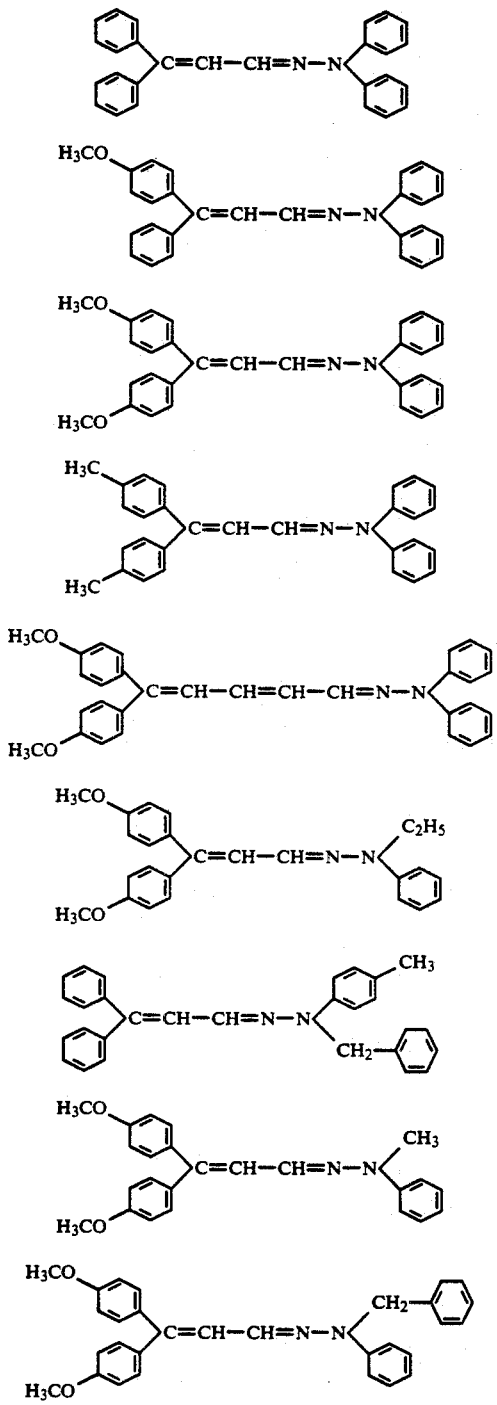

The compound represented by Formula (5) can be easily synthesized according to a method described, for example, in Japanese Pat. O.P.I. Pub. No. 15251/1984.

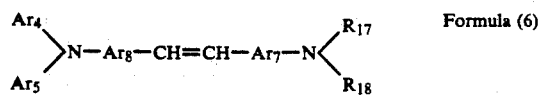

In the formula, $Ar_4$ and $Ar_5$ each represent a substituted or unsubstituted aryl group. $Ar_6$ represents a substituted or unsubstituted arylene group. $Ar_7$ represents a p-phenylene group or a naphthylene group. $R_{17}$ and $R_{18}$ each represent a substituted or unsubstituted alkyl group.

The compound represented by Formula (6) is described, for example, in Japanese Pat. O.P.I. Pub. No. 18971/1989. The following are typical examples of the compound represented by Formula (6) which are favorably used in the invention.

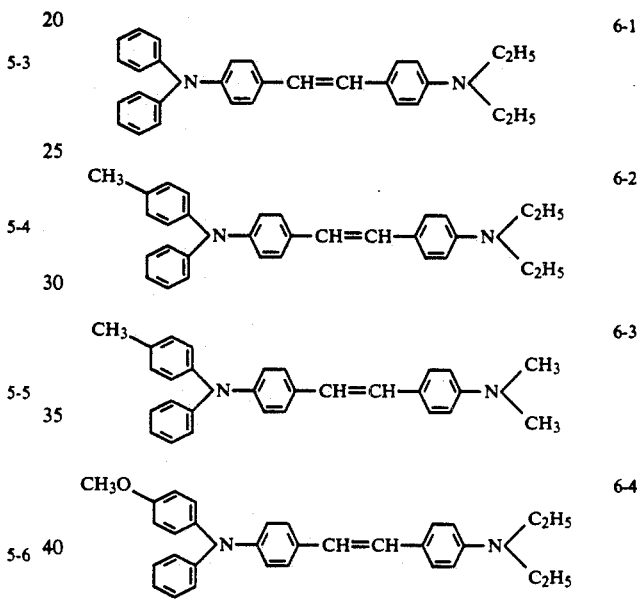

The compound represented by Formula (6) can be easily synthesized by a conventional synthesizing method.

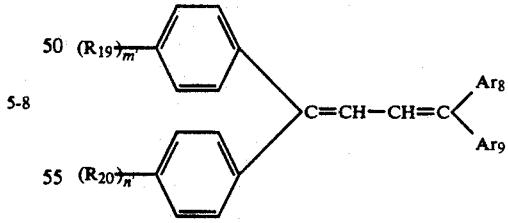

In the formula, $R_{18}$ and $R_{19}$ each represent a dialkylamino group; $Ar_8$ and $Ar_9$ each represent a substituted or unsubstituted phenyl group; m' and n' each represent 0 or 1, provided that m' and n' are not 0 at the same time.

The compound represented by Formula (7) is described, for example, in Japanese Pat. O.P.I. Pub. No. 18971/1989. The following are typical examples of the compound represented by Formula (7) which are favorably used in the invention.

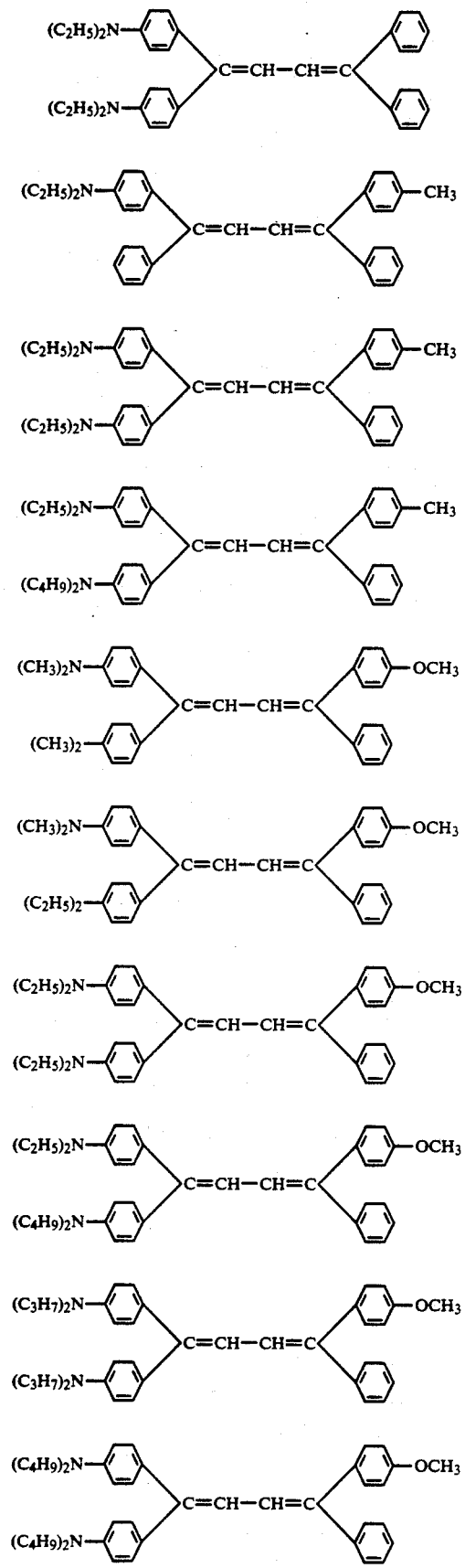

The compound represented by Formula (7) can be easily synthesized by a conventional synthesizing method.

In the invention, the difference in ionization potential between the polysilane used in a CTL and a CTM contained in a CGL is not more than 0.6 eV, preferably not more than 0.4 eV and especially not more than 0.3 eV, because a larger ionization potential difference between the CTM and the polysilane hinders the improvement in sensitivity.

The ionization potential Ip used here indicates a value of the work function measured with a Surface Analyzer AC-1 made by Riken Keiki Co. under the standard condition recommended by the maker.

Binders suitable for the invention are those which can raise the insulating property. Examples thereof include polycarbonate, polyester, methacrylic resin, acrylic resin, polyvinyl chloride, polyvinylidene chloride, polystyrtene, polyvinyl acetate, polyisoprene, polybutadiene, polyamide resin, polyurethane resin; styrene copolymer resins such as styrene-butadiene copolymer, styrene-methyl methacrylate copolymer; acrylonitrile copolymer resins such as vinyl chloride-acrylonitrile copolymer; vinyl chloride-vinyl acetate copolymer, vinyl chloride-vinyl acetate-maleic anhydride copolymer, silicone resin, silicone-alkyd resin, phenolic resin, styrene-alkyd resin, poly-N-vinylcarbazole, polyvinyl butyral, polyvinyl formal and polyhydroxystyrene. These binders may be used, singly or in combination, in an amount of 5 to 50% of the weight of a CTL in structure (1) or the weight of a PCL after deducting the weight of a CGM in structure (2).

In order to reduce the residual potential, there may be employed other CTMs such as tetracyanoethylene, tetracyanoquinodimethane, dichlorodicyano-p-benzoquinone, trinitrofluorenone, tetranitrofluorenene, fluorenylidene malonodinitrile and anil. These CTMs may also be used in a CGL of structure (1).

In addition, the following materials may be employed in order to prevent the deterioration in polymer properties caused by light, heat or chemical substances such as ozone.

1. Hindered phenol type anti-oxidants, for example, IRGANOX 1010, 245, 259, 1035, 1076, 1081, 1098, 1222, 1330, 1425WL, 3114 and 5057 made by Ciba Geigy.

2. U.V. absorbents, for example, TINUVIN P, 234, 320, 326, 327, 328 and 213 made by Ciba Geigy.

3. Light stabilizers and U.V. stabilizers, for example, TINUVIN 622LD, 144 and CHIMASSORB 944LD, 199 made by Ciba Geigy.

In general, the chemical type of the CGM is not particularly limited as long as it absorbs the light ranging from visible light to infrared light and generates free carriers. In practice, it may be selected from inorganic pigments or organic pigments.

The examples of such inorganic pigments include amorphous selenium, trigonal selenium, selenium-arsenic alloys, selenium-tellurium alloys and cadmium sulfide.

Examples of such organic pigments include (1) azo type pigments such as monoazo pigments, bisazo pigments, trisazo pigments and metal complex azo pigments; (2) perylene type pigments such as perylenecarboxylic anhydride, perylenecarboximide, (3) polycyclic quinone type pigments such as anthraquinone derivatives, anthanthrone derivatives, dibenzopyrenequinone derivatives, pyranthrone derivatives, violanthrone derivatives, isoviolanthrone derivatives, (4) indigoid type pigments such as indigoid derivatives, thioindigoid derivatives, and (5) phthalocyanine type pigments such as metallic phthalocyanines, nonmetallic phthalocyanines.

These CGMs are inadequate in film-forming property by themselves; therefore, a binder is jointly used when a CGL is formed independently.

The binder used in a CGL of structure (1) is not particularly limited in kinds, but a hydrophobic polymeric compound capable of forming an insulation film is preferred. As such a polymeric compound, there can be used the substances exemplified above as a binder to enhance the insulating property. These binders are employed preferably within a range not more than 5 parts by weight per part by weight of CGM.

Usable conductive supports include (1) plate or drum type conductive supports comprised of a metal such as aluminium or stainless steel, (2) conductive supports formed by laminating or depositing a thin layer of a metal such as aluminium, palladium or gold on a paper or plastic film support, and (3) conductive supports formed by coating or depositing a thin layer of a conductive compound such as conductive polymer, indium oxide or tin oxide on a paper or plastic film support.

EXAMPLES

The invention is hereunder described with the examples.

Examples group A

Examples 1 to 10 and Comparative Example (1)

Example A1

There was formed, on an aluminium-deposited polyester base, a 0.15 μm thick intermediate layer comprised of colopymer polyamide CM-8000 made by Toray Industries.

Next, 2 parts of titanylphthalocyanine as a CGM, 15 parts of silicone resin KR-5240 made by Shin-Etsu Chemical Co. (15% xylene-butanol solution) as a binder and 100 parts of cyclohexane as a solvent were dispersed in a sand mill. Then, the dispersion was coated with a wire bar coater to be a 0.2 μm thick CGL.

Subsequently, a 20 μm thick CTL was formed thereon by coating with a blade coater a solution dissolving 20 parts of P-1 in 100 parts of toluene. Example A1 was thus prepared.

Examples A2 to A10 were prepared likewise by use of P-2 to P-10 in place of P-1.

Comparative Example (A1) was also prepared likewise using poly(methylphenylsilane) in place of P-1.

Evaluation of the properties

Each sample was evaluated with a modified Printer LP-3015 equipped with a semiconductor light source (made by Konica Corp.). In the evaluation, the potential of non-exposed portion $V_H$ and the potential of exposed portion $V_L$ were determined as indicators of the sensitivity and the results are shown in Table 1. The film properties, namely, adhesive property, film strength and flexibility were evaluated in the following manners. The evaluation results are shown in Table 1.

Evaluation of adhesive property

A photoreceptor was formed on an aluminium-deposited 75-μm thick polyester base in a similar manner as in the above examples. By use of a knife, 11 cuts were made in parallel in this photoreceptor at intervals of 1 mm, and further 11 cuts were made at right angles to the above. Then, 100 small squares were obtained. Subsequently, a strip of adhesive tape was stuck thereon and peeled off. Then, the number of the squares which remained on the polyester base wee counted to judge the adhesive property.

Evaluation of film strength

Each photoreceptor was mounted on commercial copying machines (Printer LP 3015, 5170 and DC 9028) and subjected to a 10,000-cycle copying, then the decrease in thickness of the CTL was measured.

Evaluation of flexibility

The same samples as those used in the evaluation of adhesive property were employed. Each sample was folded double and checked whether it cracked or not. While changing the folding position each time, this procedure was repeated 20 times to count how many cracks were caused.

TABLE 1

| | | | Properties | | |
|---|---|---|---|---|---|
| Sample No. | -$V_H$ (V) | -$V_L$ (V) | Adhesive property, the number of remaining squares | Film strength decrease in thickness (μ) | Flexibility frequency of cracking |
| Example A1 | 700 | 30 | 100 | 0.1 | 0 |
| Example A2 | 750 | 40 | 100 | 0.1 | 0 |
| Example A3 | 800 | 55 | 100 | 0.2 | 0 |
| Example A4 | 810 | 60 | 100 | 0.1 | 0 |
| Example A5 | 700 | 55 | 100 | 0.1 | 0 |
| Example A6 | 680 | 40 | 100 | 0.1 | 0 |
| Example A7 | 650 | 50 | 100 | 0.1 | 0 |
| Example A8 | 690 | 55 | 100 | 0.1 | 0 |
| Example A9 | 830 | 90 | 50 | 2.0 | 10 |
| Example A10 | 850 | 80 | 70 | 0.5 | 5 |
| Comp. Example (A1) | 550 | 50 | 0 | 4.0 | 20 |

Examples group B

Example B1

On a conductive support comprised of aluminium-deposited polyester base was formed a 0.1 μm thick intermediate layer comprised of vinyl chloride-vinyl acetate-maleic anhydride copolymer Eslec MF-10 made by Sekisui Chemical Co.

A coating solution was prepared by dispersing 1 part by weight of dibromoanthanthrone having the following structure (Monolite Red 2Y made by ICI Co.), 1 part by weight of exemplified compound 6-3 as a CTM and 0.5 part by weight of polycarbonate resen Panlite L-1250 made by Teijin Chemical Co. in 100 parts by weight of 1,2-dichloroethane in a ball mill over a period of 24 hours. The coating solution was then coated on the intermediate layer by the dipping method, so that a 0.5 μm thick CGL was formed.

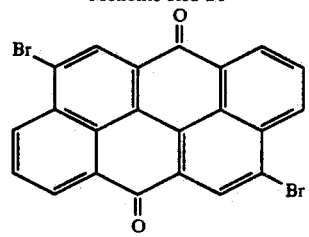

Monolite Red 2Y

Subsequently, CTLs were respectively formed thereon in the same manner as in Examples group A to prepare Examples B1 to B10 and Comparative Example (B1).

Evaluation of the properties

The black paper potential $V_B$ and the white paper potential $V_W$ were evaluated with a modified U-Bix 5170.

TABLE 2

| Sample No. | $-V_B$ (V) | $-V_W$ (V) | Adhesive property, the number of remaining squares | Film strength decrease in thickness (μm) | Flexibility frequency of cracking |
| --- | --- | --- | --- | --- | --- |
| Example B1 | 800 | 75 | 100 | 0.1 | 0 |
| Example B2 | 810 | 80 | 100 | 0.1 | 0 |
| Example B3 | 820 | 85 | 100 | 0.1 | 0 |
| Example B4 | 780 | 70 | 100 | 0.1 | 0 |
| Example B5 | 770 | 80 | 100 | 0.1 | 0 |
| Example B6 | 750 | 70 | 100 | 0.1 | 0 |
| Example B7 | 800 | 65 | 100 | 0.1 | 0 |
| Example B8 | 850 | 70 | 100 | 0.1 | 0 |
| Example B9 | 800 | 90 | 70 | 0.6 | 3 |
| Example B10 | 750 | 100 | 20 | 0.3 | 2 |
| Comp. Example (B1) | 600 | 120 | 0 | 5.0 | 20 |

Examples group C

Example C1

A coating solution was prepared by dispersing the following composition by use of a sand mill.

| | |
| --- | --- |
| CGM: χ-type nonmetallic phthalocyanine | 20 parts by weight |
| CTM: P-1 | 50 parts by weight |
| THF; | 1000 parts by weight |

This coating solution was dip-coated to a dry thickness of 15 μm on the substrate of photoreceptor A1 for the use of a Digital Copying Machine DC 9028 made by Konica Corp.

Examples C2 to C10 were prepared by replacing P-1 used as the CTM with P-2 to P-10, and Comparative Example (C1) was prepared by replacing P-1 with a poly(methylphenylsilane).

Evaluation of the properties

The potential of non-exposed portion $V_H$ and the potential of exposed portion $V_L$ at the first developed position were determined on the DC 9028 for each sample.

TABLE 3

| Sample No. | $-V_B$ (V) | $-V_W$ (V) | Adhesive property, the number of remaining squares | Film strength decrease in thickness (μm) | Flexibility frequency of cracking |
| --- | --- | --- | --- | --- | --- |
| Example C1 | 850 | 50 | 70 | 0.2 | 1 |
| Example C2 | 800 | 70 | 100 | 0.4 | 2 |
| Example C3 | 830 | 80 | 80 | 0.1 | 1 |
| Example C4 | 820 | 50 | 80 | 0.2 | 2 |
| Example C5 | 810 | 40 | 70 | 0.2 | 0 |
| Example C6 | 780 | 55 | 100 | 0.1 | 2 |
| Example C7 | 880 | 60 | 80 | 0.1 | 0 |
| Example C8 | 780 | 90 | 70 | 0.1 | 3 |
| Example C9 | 770 | 110 | 60 | 0.7 | 5 |
| Example C10 | 750 | 100 | 60 | 0.5 | 2 |
| Comp. Example (C1) | 800 | 150 | 0 | 2.0 | 20 |

Figure 1:
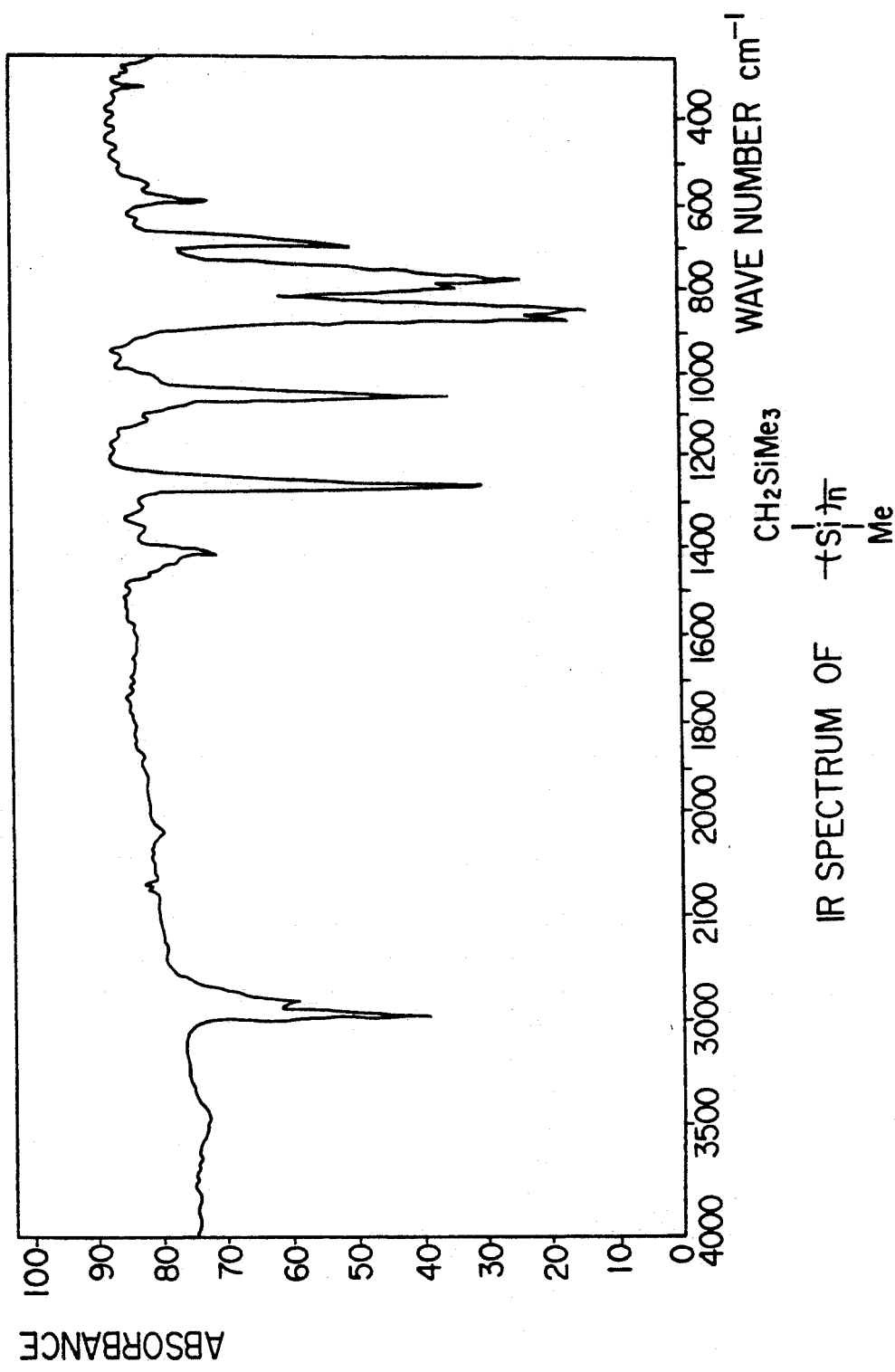
FIG. 1 is an IR spectral map of the poly[(trimethylsilylmethyl)methylsilylene] of the invention.
Figure 2:
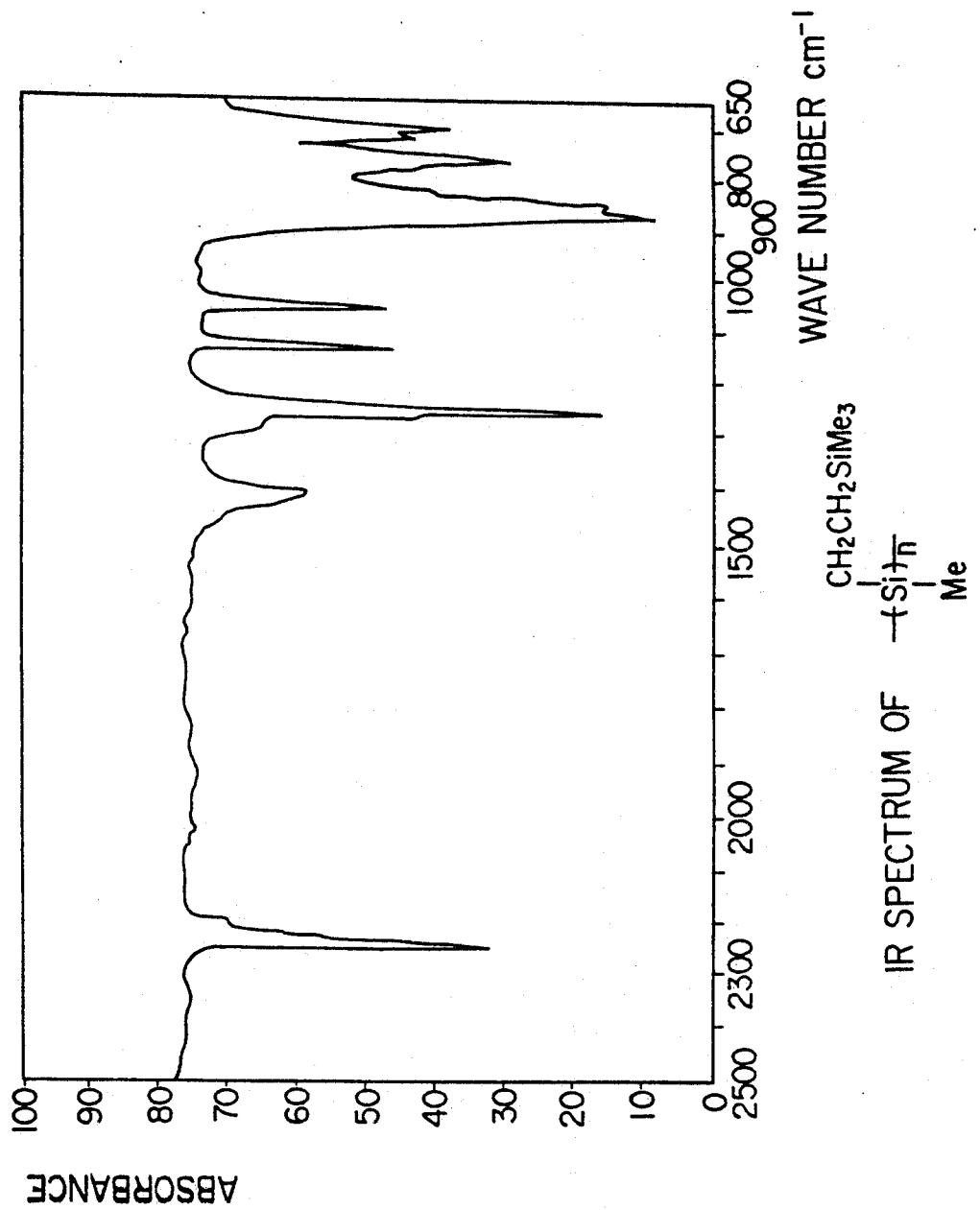
FIG. 2 is an IR spectral map of the poly[(2-trimethylsilylethyl)methylsilylene] of the invention.
Figure 3:
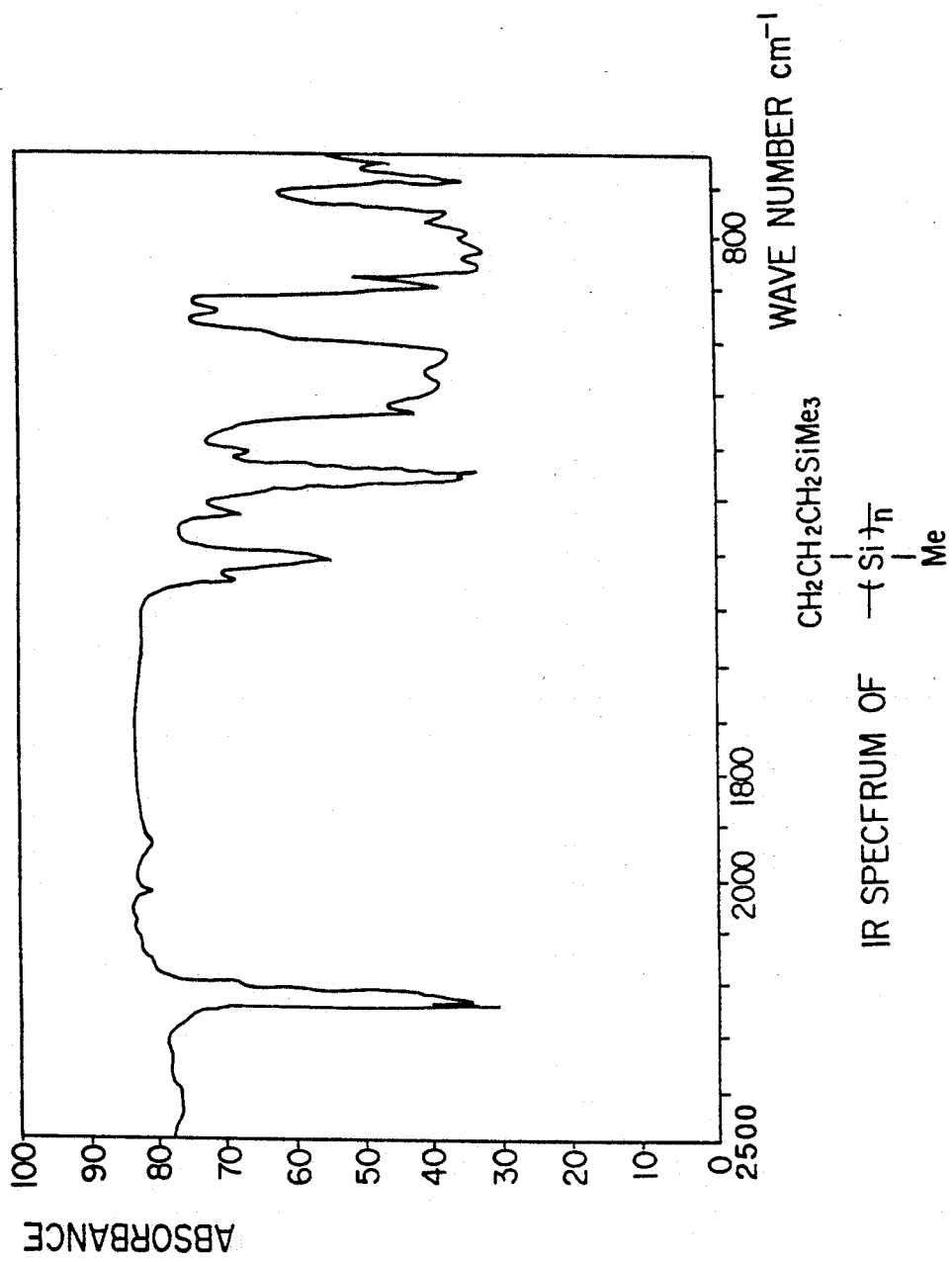
FIG. 3 is an IR spectral map of the poly[3-(trimethylsilylpropyl)methylsilylene] of the invention.
Figure 4A:
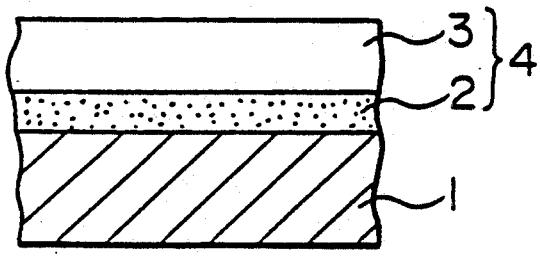
FIG. 4 shows cross sectional views of the photoreceptors according to the invention.
Figure 4B:
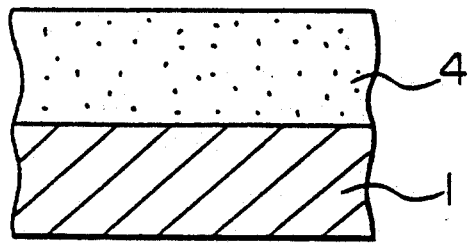
Figure 4C:
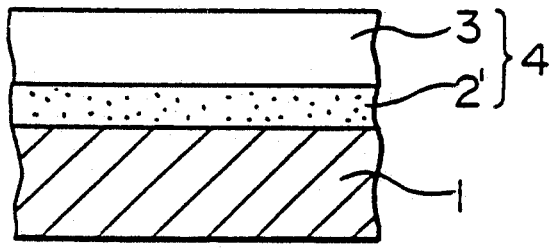
Figure 4D:
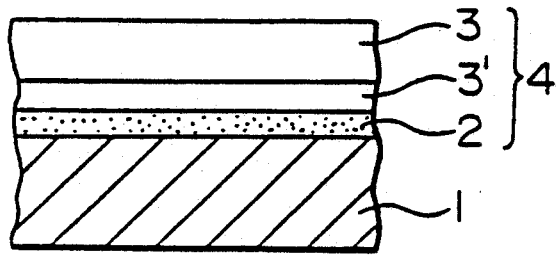

Explanation of the numerical signs
1: conductive support
2: carrier generation layer (CGL)
3: carrier transfer layer (CTL)
4: photoreceptive layer (PCL)

What is claimed is:

1. An electrophotographic photoreceptor comprising a conductive support and provided thereon, a carrier generating material and a polymer having a repetition unit represented by the following formula (1);

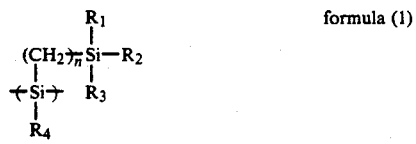

formula (1)

wherein $R_1$, $R_2$, $R_3$, and $R_4$ independently represent a hydrogen atom, an alkyl group, an alkoxy group, an alkenyl group, an aryl group, an alkylsilyl group or an arylsilyl group, and n is an integer of 1 to 5.

2. The photoreceptor of claim 1, wherein said polymer is a homopolymer or copolymer having said repetition unit in its structure.

3. The photoreceptor of claim 1, wherein said alkyl group has 1 to 24 carbon numbers, said alkoxy group has 1 to 10 carbon numbers, said alkenyl group has 2 to 10 carbon numbers, said aryl group has 6 to 24 carbon numbers, said alkylsilyl group represents $-SiH(CH_3)_2$, $-Si(CH_3)_3$, $-Si(C_3H_7)_3$, $-Si(C_4H_9)_3$, $-Si(CH_3)_2(C_2H_5)$ or $-Si(CH_3)(C_2H_5)_2$, said arylsilyl group represents $-SiH(C_6H_5)_2$, $-Si(CH_3)_2(C_6H_5)$ or $-CH_2Si(CH_3)_2(C_6H_5)$, and n represents an integer of 1 to 5.

4. The photoreceptor of claim 1, wherein in said formula (1), $R_1$, $R_2$ and $R_3$ independently represent a methyl group or a methoxy group, $R_4$ represents a methyl group or a phenyl group, and n is an integer of 1 to 3.

5. The photoreceptor of claim 1, wherein said layer further comprises an auxiliary carrier transfer material.

6. The photoreceptor of claim 5, wherein the content ratio by weight of the auxiliary carrier transfer material to the polymer in said layer is within the range of from 0.01 to 2.0.

7. The photoreceptor of claim 1, wherein said photoreceptor is composed of a first layer containing the carrier generating material and a second layer containing the polymer.

8. The photoreceptor of claim 1 further comprising an auxiliary carrier transfer material.

* * * * *